United States Patent
Dalsgaard (10) Patent No.: US 11,968,703 B2
(45) Date of Patent: Apr. 23, 2024

(54) ENHANCING EARLY MEASUREMENT REPORTING

(71) Applicant: Nokia Technologies Oy, Espoo (FI)

(72) Inventor: Lars Dalsgaard, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 289 days.

(21) Appl. No.: 17/507,133

(22) Filed: Oct. 21, 2021

(65) Prior Publication Data

US 2022/0132519 A1   Apr. 28, 2022

(30) Foreign Application Priority Data

Oct. 23, 2020   (FI) .................................. 20206050

(51) Int. Cl.
| | |
|---|---|
| *H04W 72/542* | (2023.01) |
| *H04W 72/044* | (2023.01) |
| *H04W 72/21* | (2023.01) |

(52) U.S. Cl.
CPC ....... *H04W 72/542* (2023.01); *H04W 72/044* (2013.01); *H04W 72/21* (2023.01)

(58) Field of Classification Search
CPC .. H04W 72/542; H04W 72/21; H04W 72/044
USPC ....................................................... 370/252
See application file for complete search history.

(56) References Cited

U.S. PATENT DOCUMENTS

| | | | |
|---|---|---|---|
| 2016/0014692 A1* | 1/2016 | Kim ...................... | H04W 48/16 370/252 |
| 2019/0150014 A1 | 5/2019 | Virtej et al. | |
| 2022/0338074 A1* | 10/2022 | Hu ........................ | H04W 48/12 |

FOREIGN PATENT DOCUMENTS

| | | |
|---|---|---|
| WO | 2020/167205 A1 | 8/2020 |
| WO | 2020/197474 A1 | 10/2020 |

OTHER PUBLICATIONS

"3rd Generation Partnership Project; Technical Specification Group Radio Access Network; Evolved Universal Terrestrial Radio Access (E-UTRA); Requirements for support of radio resource management (Release 16)", 3GPP TS 36.133, V16.7.0, Sep. 2020, 3704 pages.

(Continued)

*Primary Examiner* — Chi Tang P Cheng
(74) *Attorney, Agent, or Firm* — Robert P. Michal, Esq.; Carter, DeLuca & Farrell LLP (57) ABSTRACT

There is provided a method comprising: performing, by a user equipment, UE, of a wireless communication network, one or more early measurements on at least one carrier according to at least one determined measurement periodicity, wherein a measurement periodicity for a carrier of the at least one carrier is determined to be a first periodicity or a second different periodicity if a first condition regarding one or more serving cell thresholds is met and the first periodicity if a second condition regarding the one or more cell serving cell is met; and in response to a request from a network element of the wireless communication network, transmitting an early measurement report comprising one or more measurement results obtained by performing the one or more early measurements.

16 Claims, 6 Drawing Sheets

(56) References Cited

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.2.1, Sep. 2020, pp. 1-1081.
"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.
"3rd Generation Partnership Project; Technical Specification Group Radio Access Network; NR; Requirements for support of radio resource management (Release 16)", 3GPP TS 38.133, V16.5.0, Sep. 2020, 1608 pages.
"Early Measurement Reporting", 3GPP TSG-RAN WG4 Meeting#94bis-e, R4-20xxxxx, Agenda: 9.7.2.2, Nokia, May 25-Jun. 5, 2020, 15 pages.
"DRAFT Meeting Report for TSG RAN WG4 meeting: #95e", Third Generation Partnership Project (3GPP™M), May 25-Jun. 5, 2020, 353 pages.
"CR introducing enhanced utilization of CA and idle mode measurements for early reporting", 3GPP TSG-RAN WG4 Meeting #88, R4-1811925, Nokia, Aug. 20-24, 2018, 3 pages.
"Search threshold applicability in euCA", 3GPP TSG-RAN WG4 Meeting#96, R4-2010561, Agenda: 5.3, Nokia, Aug. 17-28, 2020, 2 pages.
"CR on UE requirement for MR-DC early measurement reporting in 36.133", 3GPP TSG-RAN WG4 Meeting #96, R4-2010570, Nokia, Aug. 17-28, 2020, 6 pages.
Office action received for corresponding Finnish Patent Application No. 20206050, dated Feb. 24, 2021, 9 pages.
"Discussion on early measurement in NR", 3GPP TSG-RAN WG4 Meeting #96-e, R4-2011145, Agenda: 7.5.3.1.1, Huawei, Aug. 17-28, 2020, pp. 1-7.
"Supporting early measurement reporting in NR", 3GPP TSG RAN WG2 Meeting #105, R2-1900104, Agenda: 11.10.3, Qualcomm Incorporated, Feb. 25-Mar. 1, 2019, pp. 1-6.
"Email discussion summary for [96e][212] LTE_NR_DC_CA_RRM_1", 3GPP TSG-RAN WG4 Meeting # 96-e, R4-2012212, Agenda: 7.5.3.1, Nokia, Aug. 17-28, 2020, 49 pages.
"Early Measurement Reporting", 3GPP TSG-RAN WG4 Meeting#97-e, R4-2015881, Agenda: 7.5.2.1, Nokia, Nov. 2-11, 2020, 20 pages.

\* cited by examiner

302: PERFORMING MEAUSUREMENT(S) ON CARRIER(S) ACCORDING TO FIRST OR SECOND PERIODICITY IF FIRST CONDITION IS MET AND FIRST PERIODICITY IF SECOND CONDITION IS MET

304: TRANSMITTING MEASUREMENT REPORT COMPRISING MEASUREMENT RESULTS(S) OBTAINED BY PERFORMING MEASUREMENT(S) ON CARRIER(S)

Fig. 3

402: TRANSMITTING MEASUREMENT REPORT REQUEST TO UE

404: RECEIVING MEASUREMENT REPORT COMPRISING MEASUREMENT RESULT(S) OBTAINED BY PERFORMING MEASUREMENT(S) ON CARRIER(S) ACCORDING TO FIRST OR SECOND PERIODICITY IF FIRST CONDITION IS MET AND FIRST PERIODICITY IF SECOND CONDITION IS MET

406: UTILIZING MEASUREMENT REPORT IN CONFIGURING UE FOR DATA TRANSFER

ENHANCING EARLY MEASUREMENT REPORTING

TECHNICAL FIELD

The following exemplary embodiments relate to communications.

BACKGROUND

Modern wireless networks may utilize various techniques, such as early measurement reporting (EMR). Such functionality may enable user equipment to measure one or more carriers and transmit the measurement results to network when requested. It may be beneficial to enhance EMR in order to improve resource configuration by the wireless network.

BRIEF DESCRIPTION

According to an aspect, there is provided the subject matter of the independent claims. Some embodiments are defined in the dependent claims.

The embodiments that do not fall under the scope of the claims are to be interpreted as examples useful for understanding the disclosure.

One or more examples of implementations are set forth in more detail in the accompanying drawings and the description below. Other features will be apparent from the description and drawings, and from the claims.

BRIEF DESCRIPTION OF DRAWINGS

In the following some embodiments will be described with reference to the attached drawings, in which.

DETAILED DESCRIPTION OF SOME EMBODIMENTS

The following embodiments are examples. Although the specification may refer to "an", "one", or "some" embodiment(s) in several locations, this does not necessarily mean that such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
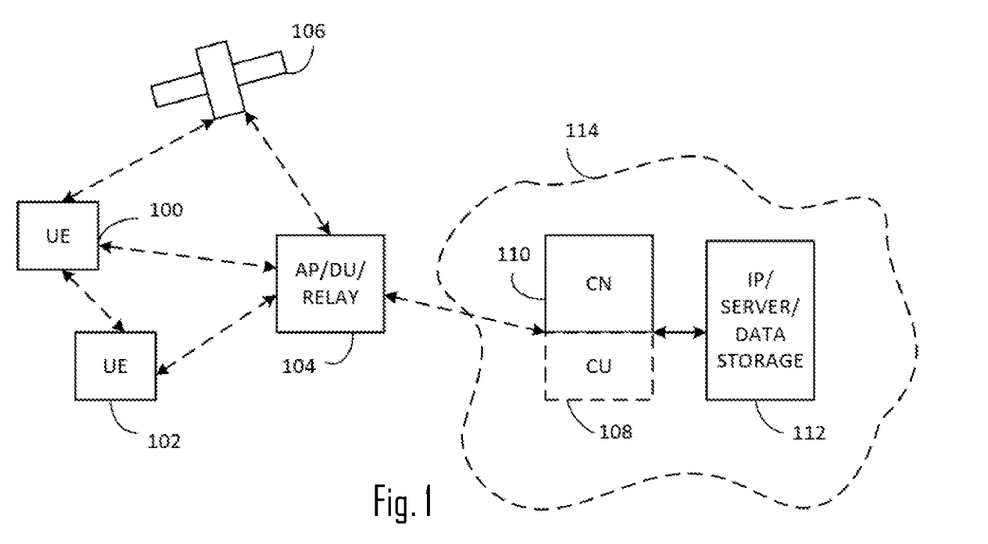
FIG. 1 illustrates an example of a wireless communication system to which embodiments may be applied.

FIG. 1 depicts examples of simplified system architectures showing some elements and functional entities whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network. FIG. 1 shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. An example of relay station is integrated access and backhaul (IAB) node where the base station functionalities are carried out by the DU (Distributed Unit) part of the IAB node. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobility management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of relay station deployment is IAB node where the user device functionalities are carried out by the MT (Mobile Termination) part of the IAB node. MT part may be responsible for providing the backhaul connection(s) with a parent node, such as parent IAB node (DU), or a donor node (DU) having a wired connection to the CU (Centralized Unit).

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink device, of which an example is a camera or video camera loading images or video clips to a network. A user device may also be a device having capability to operate in Internet of Things (IoT) network, such as Industrial IoT (IIoT) network, which is a scenario in which objects are provided with the ability to transfer data over a network without needing human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses. User device herein may also refer to vehicular implementations, such as vehicle UEs. Such UEs may be comprised and/or communicatively coupled with vehicle such that they may be understood as part of the vehicle or vehicles.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not necessarily shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the substantially same infrastructure to run services that have different requirements on latency, reliability, throughput and mobility.

The current architecture in LTE networks is fully distributed in the radio and typically fully centralized in the core network. The low-latency applications and services in 5G may need to bring the content close to the radio which leads to local break out and multi-access edge computing (MEC). 5G enables analytics and knowledge generation to occur at the source of the data. This approach may need leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano)satellites are deployed). Satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is an example of a part of a radio access system and in practice, the system may comprise a plurality of (e/g) NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs may be needed to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network, may aggregate traffic from a large number of HNBs back to a core network. The network discussed herein may refer to, for example, cellular network such as 5G and the like.

As indicated with an arrow in FIG. 1, the UEs 100, 102 (and/or any other UE of the described system) may support device-to-device (D2D) communication. D2D communication may sometimes be referred to as sidelink communication.

Figure 2:
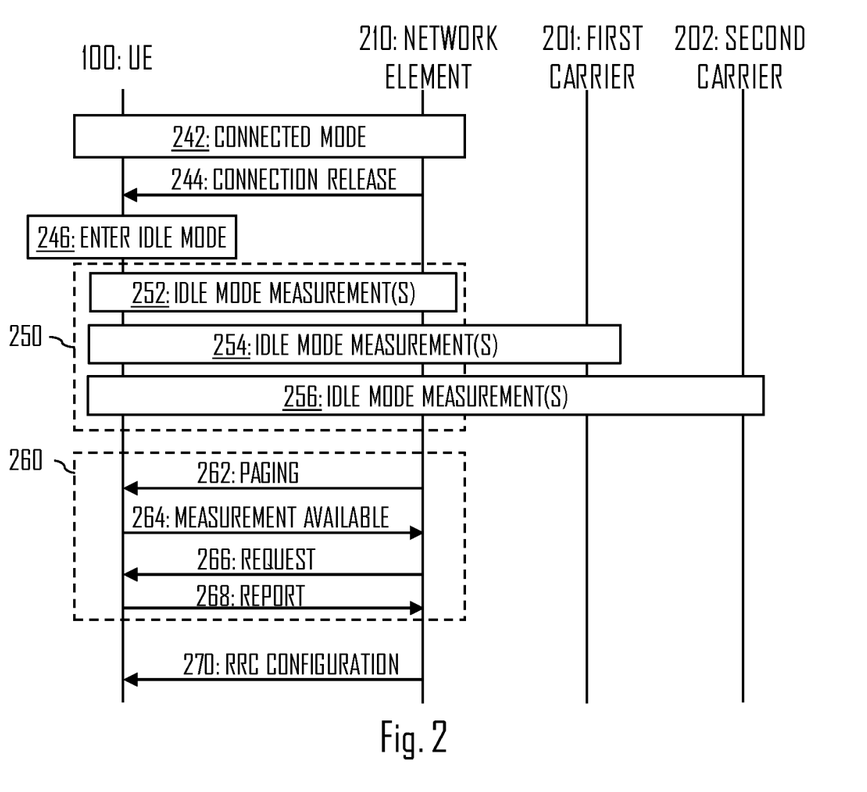
FIG. 2 illustrates an example of early measurement reporting.

The described system of FIG. 1 (sometimes referred to as wireless communication system), may support early measurement reporting (EMR). This is sometimes referred to as Multi Radio Dual Connectivity (MR-DC) EMR. The purpose of EMR may be to enable faster configuration of Carrier Aggregation (CA) and/or Dual Connectivity (DC) during or after connection setup. By configuring the UE(s) to perform measurements for EMR during connection setup, the UE may be able to provide measurement results from measurements performed in idle mode, on certain carrier(s)/cell(s), during the connection setup. Thus, the UE may provide an early measurement report comprising the measurement results obtained from measurements performed during idle mode when requested by the network (e.g. by network node 104 from UE 100, 102). FIG. 2 illustrates example of such functionality. Some embodiments may be applied to the examples described with reference to FIG. 2. However, the embodiments may not necessarily be restricted to the examples of FIG. 2. Hence, FIG. 2 may be understood as depicting illustrative examples. Further, FIG. 2 refers to measurement(s) performed during idle mode. However, it is noted that the presented embodiments and examples may be utilized in other modes, e.g. inactive mode instead of or in addition to idle mode. Hence, for example, the measurement(s) may be performed during inactive mode by the UE.

In block 242, UE 100 may be in connected mode which may mean that the UE 100 has established connection with a network element 210 (e.g. network node 104 or CU 108/CN 110).

The network element 210 may transmit connection release 244 to UE 100. For example, during the connection release, the network element 210 may configure the UE 100 to perform measurements for early measurement reporting (early measurements) on one or more carriers.

UE 100 may enter idle mode (block 246). During idle mode 250, while timer (e.g. T331) is running, the UE may perform measurements on the configured carriers for obtaining measurement results for the early measurement report. Some idle mode measurements performed by the UE 100 are depicted with blocks 252, 254, 256.

In some examples, block 252 may refer to idle mode measurements performed on the serving carrier or carriers. These measurements may be referred to as serving cell measurements and/or intra-frequency measurements.

The UE 100 may additionally be configured to measure one or more carriers and/or cells (e.g. first and second carriers 201, 202 or on first and second carriers 201, 202) during idle mode. For example, these measurements may sometimes be referred to as inter-frequency or inter-RAT measurements, i.e. measurements performed on non-serving carrier(s) of the same Radio Access Technology (RAT) as the serving carrier or measurements performed on non-serving carrier(s) of a different RAT than the serving carrier. The carriers 201 and 202 (e.g. provided by network element 210) may be of same RAT.

At this point it is noted that carrier may refer to a specific radio carrier frequency or radio channel(s) that may be used by UE and network for communication e.g. for data exchange (i.e. used for carrying data).

Block 260 illustrates the connection establishment procedure (or connection setup) without illustrating the details. Block 260 may be entered by the UE 100 after idle mode 250, for example if paged by the network. The network element 210 may page 262 UE 100. Once connection establishment procedure is initiated, the UE 100 may, during the establishment procedure, indicate 264 to the network element 210, during the connection setup, if it has idle mode measurement results for reporting available. If so, the measurements may be requested by the network element 210 (see arrow 266).

If the measurements are requested by the network, the UE 100 may report the measurements 268 (i.e. transmit early measurement report) to the network element 210. The network element 210 may utilize the early measurement report in configuring the UE 100 for data transfer. Particularly, this may mean that the early measurement report is used for configuring the UE 100 with CA and/or DC. This way, the network element 210 may configure UE 100 with CA and/or DC without waiting for measurement results performed after entering connected mode based on a connected measurement configuration and measurement report triggering. Configuration by the network element 210 is shown with arrow 270. The configuration 270 may be performed via Radio Resource Control (RRC) signaling, for example.

Measuring different carriers (e.g. network element 210 carrier(s), carrier 201, and 202) may require measuring flexibility in order to maintain and/or increase network performance. Moreover, if all carriers are measured the same way, for example, for a moving UE, the measurement results may be different than for a stationary UE. Hence, for example, flexibility of measurement periodicity may enhance the accuracy and/or validity of the obtained results for all or at least some measured carriers. This may further improve resource configuration. Therefore, there is proposed a solution for enhancing multicarrier measurement procedure. For example, the proposed solution may be applicable for the EMR procedure, i.e. carriers may be measured during idle mode and the measurement results indicated promptly when requested by the network.

Figure 3:
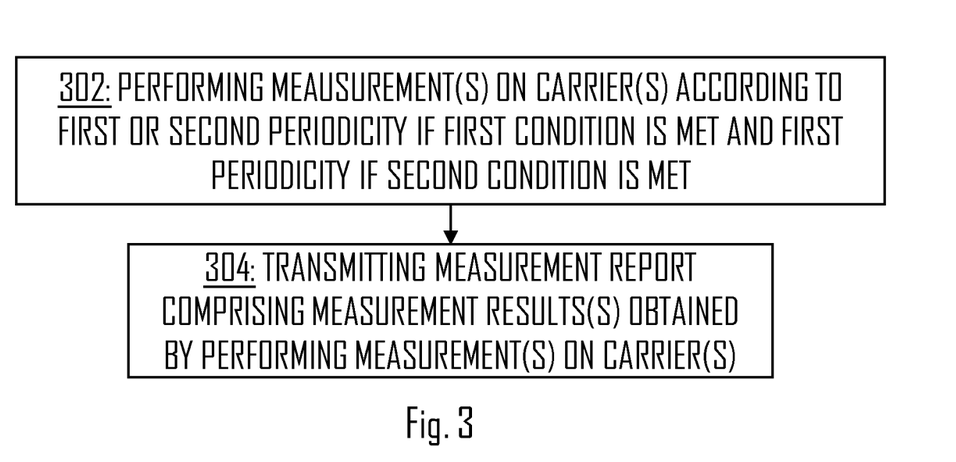
FIGS. 3 and 4 illustrate flow diagrams according to some embodiments.

FIG. 3 illustrates a flow diagram according to an embodiment. Referring to FIG. 3, a method for a UE of a wireless communication network is provided, the method comprising: performing one or more early measurements on at least one carrier according to at least one determined measurement periodicity, wherein a measurement periodicity for a carrier of the at least one carrier is determined to be a first periodicity or a second periodicity if a first condition regarding one or more serving cell thresholds is met and the first periodicity if a second condition regarding the one or more serving cell thresholds is met (block 302); and in response to a request from a network element of the wireless communication network, transmitting an early measurement report comprising one or more measurement results obtained by performing the one or more early measurements (block 304).

Figure 4:
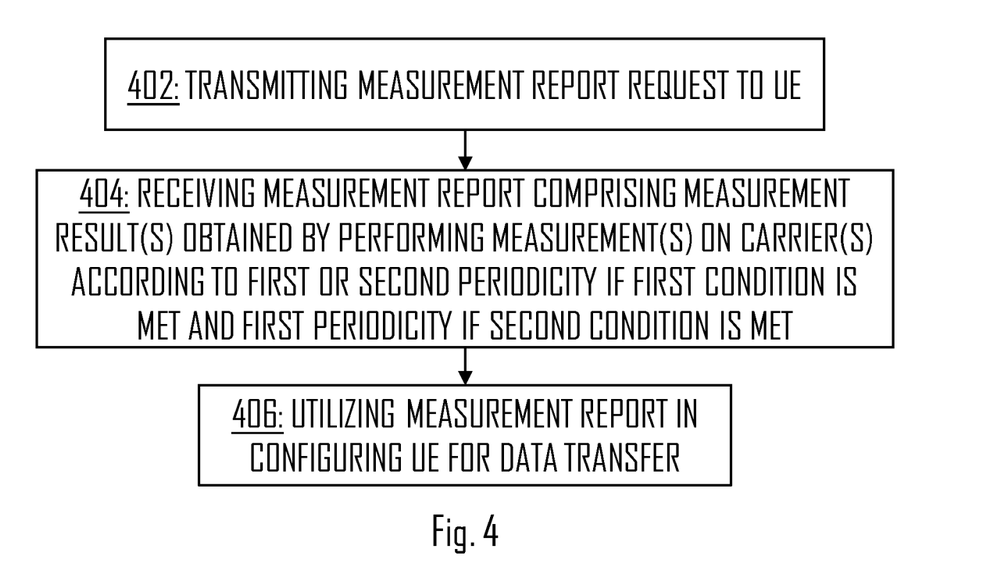

FIG. 4 illustrates a flow diagram according to an embodiment. Referring to FIG. 4, a method for a network element of a wireless communication network is provided, the method comprising: transmitting an early measurement report request to a UE of a wireless communication network (block 402); in response to the request, receiving the early measurement report comprising one or more measurement results obtained by performing one or more early measurements on at least one carrier according to at least one measurement periodicity, wherein a measurement periodicity for a carrier of the at least one carrier is a first periodicity or a second periodicity if a first condition regarding one or more serving cell thresholds is met and the first periodicity if a second condition regarding the one or more serving cell thresholds is met (block 404); and utilizing the early measurement report in configuring the UE for data transfer (block 406).

The described methods of FIGS. 3 and 4 may be applicable in the system (e.g. wireless communication network) of FIG. 1 and for the example scenarios illustrated in FIG. 2, for example. The UE discussed with respect to FIGS. 3 and 4 may be, for example, UE 100, or UE 102, or some other similar network device(s). The network element discussed with respect to FIGS. 3 and 4 may refer to network node 104, or to CN 110/CU 108, for example, or to some other network element configured to carry out the described method steps. For example, the network element may refer to one or more network entities (e.g. physically separate network entities). For example, the network element may be or comprise the network element 210. In an example embodiment, the network element is or comprises a gNB.

The proposed solution may increase flexibility of the EMR procedure by enabling measurement of carriers (e.g. inter frequency carriers, i.e. non-serving carriers) with different measurement periodicities (e.g. first and second periodicity). Measurement periodicity may mean the periodicity which is utilized in the measurement procedure. For example, measurement periodicity may be indicated in seconds. For example, measurement period of 60 seconds may mean that UE measures carrier every 60 seconds. One example of a shorter measurement period may be two (2) seconds or measurement periodicity used for idle mode measurements. Example of a longer measurement period may be 75 seconds. The time instant when a measurement happens may be referred to as measurement event or measurement instant. The early measurement report may comprise measurement results from one or more of said measurement events or instants per carrier, for example. So, to put it in other words, interval between measurement events or instants may be longer if early measurements (or idle mode measurements) are performed according to a longer periodicity compared with interval between measurement events or instants if the measurements are performed according to a shorter periodicity.

In an embodiment, the first periodicity and the second periodicity are different from each other. This may mean that the first periodicity and the second periodicity have different lengths. In an embodiment, the second periodicity is longer than the first periodicity. So, applying second periodicity may mean that the measurement periodicity is longer compared with applying the first periodicity. In an example, the second periodicity is configured to equal to at least $T_2$ seconds, wherein $T_2=60*\text{Nlayers}$. Nlayers may equal to the number of configured high priority carriers. In an example, the first periodicity is configured to equal to $T_1$ seconds, wherein $T_1=\text{Kcarrier}*T_{measure,NR\_Inter}$. Kcarrier is the number of carriers configured for measurements and $T_{measure,NR\_Inter}$ is the measurement instant of the carriers measured. Utilizing the second periodicity may enable to save power with the cost of increasing measurement intervals. This may be suitable for some scenarios, but for some other scenarios it may be beneficial to utilize the shorter periodicity.

The different measurement periodicities may be applied, for example, in the case that the serving cell (e.g. provided by the network element 210), broadcasts that the use of s-NonIntraSearch is allowed in the cell. s-NonIntraSearch may refer to serving cell threshold(s) which may be discussed below in greater detail. In some examples, said serving cell threshold may be referred to as cell search threshold.

For example, the UE may be configured to perform intra-frequency measurements on one or more serving carriers and inter-frequency measurements on one, two, or more inter-frequency carriers. For example, the inter-frequency carriers may be measured with the second measurement periodicity.

In an embodiment, the UE 100 measures a first inter-frequency carrier with first periodicity and a second inter-frequency carrier with second periodicity. For example, the first inter-frequency carrier may be an EMR carrier and the second inter-frequency carrier may be a non-EMR carrier, such as high priority carrier.

Figure 5:
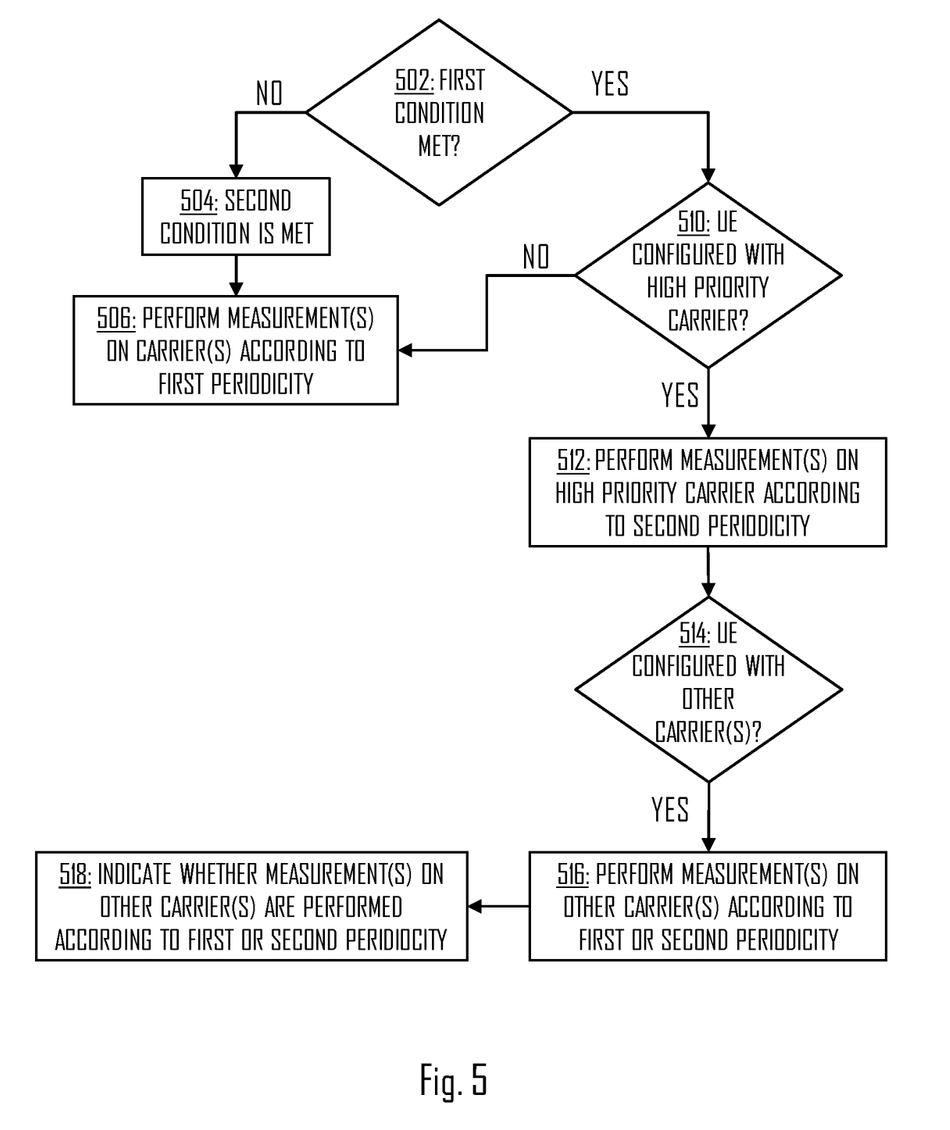
FIGS. 5, 6, 7, and 8 illustrate some embodiments.

FIG. 5 illustrates flow diagram according to some embodiments. Referring to FIG. 5, in block 502, the UE 100 may determine whether or not first condition is met. If yes, process may continue to block 510. If no, this may mean that the second condition is met (block 504). The UE 100 may thus determine whether the first condition or second condition is met. Although not shown in FIG. 5, the determination may be performed other way around, i.e. the UE 100 may determine whether or not second condition is met: if yes, the process may continue to block 506, and if no, the first condition may be met and the process may continue to block 510.

If the second condition is met (block 504), in block 506, the UE 100 may perform one or more measurement(s) on the one or more carrier(s) according to the first periodicity. For example, UE 100 may measure configured carriers according to the first periodicity. For example, UE 100 may measure configured EMR carriers according to the first periodicity if the second condition is met. The EMR carriers may comprise carriers which are also measured for other reasons than for early measurement reporting like e.g. mobility. EMR carriers may comprise overlapping EMR carriers. In an embodiment, the UE 100 is configured to measure configured overlapping EMR carriers (e.g. all EMR overlapping EMR carriers configured for the UE 100) according to the first periodicity if the second condition is met.

If the first condition is met, the UE 100 may further determine whether or not the UE 100 is configured with one or more high priority carriers. If no, the process may continue to block 506. Thus, if the first condition is met and the UE is not configured with one or more high priority carriers, the UE may perform the one or more early measurements according to the first periodicity (block 506). In this example, the UE 100 may measure configured EMR carriers (e.g. configured overlapping EMR carriers) according to the first periodicity if first condition is met, but there are no high priority carriers configured to be measured by the UE.

If determination in block 510 is positive (i.e. UE is configured with one or more high priority carrier, the process may continue to block 512. In block 512, the UE 100 may perform one or more measurements on a high priority carrier according to the second periodicity. So, if the first condition is met and the UE is configured with at least one high priority carrier, the UE 100 may measure the at least one high priority carrier (or possibly more than one high priority carrier) according to the second periodicity. High priority carrier described herein may refer to a carrier that has higher priority compared with low or normal priority carriers. For example, the high priority carrier may refer to a non-EMR carrier having higher priority than one or more low or normal priority non-EMR carriers. In an embodiment, if first condition is met and the UE is configured with a high priority carrier, the UE 100 may measure the at least one carrier (e.g. also other than high priority carrier(s)) according to the second periodicity.

In block 514 (e.g. after block 512), the UE 100 may determine whether or not the UE 100 is further configured with at least one different carrier. Said at least one different carrier may refer to, for example, EMR carrier, such as, but not restricted to, an overlapping EMR carrier. Thus, if the first condition is met and the UE is configured with the high priority carrier and at least one different carrier, the UE 100 may perform one or more early measurements on the at least one different carrier according to the first periodicity or the second periodicity (block 516). So, if the high priority carrier is measured according to the second periodicity, the at least one different carrier (e.g. overlapping EMR carrier(s)) may be measured according to the first periodicity or the second periodicity.

In an embodiment, the UE 100 determines whether to measure the at least one different carrier according to the first periodicity or the second periodicity in block 516. For example, in such case, in block 518, the UE 100 may further indicate whether it has measured the at least one different carrier according to the first periodicity or the second periodicity. The indication may be transmitted to the network element 210, for example. In an embodiment, the indication is comprised in the early measurement report. Thus, the network element 210 may determine what or which periodicity has been used in obtaining the measurement result(s) for a certain carrier or carriers. This may enable the network element 210 to determine validity and/or accuracy of the measurement results. Such indication may be beneficial, for example, in cases where the UE 100 may select what or which periodicity it utilizes in measuring a carrier. On the other hand, the indication may not be needed in cases where the one or more conditions and/or rules define how the carrier should be measured. For example, for high priority carrier, the network element 210 may determine that the second periodicity is used. In some examples, the periodicity may be indicated for all configured carriers or at least for all configured inter-frequency carriers. In some examples, it may be simpler to configure the UE 100 to indicate the used periodicity per carrier instead of indicating the periodicity for some measured carriers. However, both may be applicable solutions.

According to an embodiment, the at least one different carrier is measured according to the second periodicity (i.e. in block 516). This may be indicated to the network element 210 in block 518, for example.

According to an embodiment, the at least one different carrier is measured according to the first periodicity (i.e. in block 516). This may be indicated to the network element 210 in block 518, for example.

High priority carrier herein may, in some embodiments, refer to a high priority non-EMR carrier. The at least one different carrier or at least one other carrier (e.g. see block 516) may refer to EMR carrier or carriers in some embodiments.

In an embodiment, the UE 100 determines whether or not first condition is met. If yes, the UE 100 may, for example, measure configured carriers (e.g. inter-frequency carriers) according to first or second periodicity. Example of this is shown in FIG. 5. If no, the UE 100 may measure configured inter-frequency carriers according to the first periodicity (i.e. second condition is met. Such behavior may thus be based on UE determination in some examples.

In another example embodiment, the UE 100 may be configured, e.g. by the network element or via preconfiguration, to utilize either first or second periodicity for configured carriers (e.g. inter-frequency carriers) or to at least one configured carrier. In one example, the network element 210 indicates (e.g. by transmitting one or more messages) to the UE 100 whether the UE 100 should use first or second periodicity for measuring the configured carriers. For example, the indication may be carrier specific, carrier type specific, common to a group of carriers, or common to all configured carriers. Similar configuration may be achieved by preconfiguration. For example, preconfiguration may be used to define that certain type of carriers should be measured using a certain periodicity (e.g. one of first and second periodicities). In some example, the configuration may comprise both preconfiguration and configuration by the network element 210.

In an embodiment, the network element 210 transmits one or more messages to the UE 100, wherein the one or more messages indicate which of the first periodicity or second periodicity to use. Thus, the UE 100 may determine whether to use first periodicity or second periodicity (e.g. in block 516). If the network element 210 indicates the use of certain periodicity, there may be no benefit of transmitting the indication of block 518 to the network element 210 at least regarding those carrier(s) of which the network 210 knows the used measuring periodicity. In one option the use of first or second periodicity by the UE is defined explicitly in one or more specifications.

In an embodiment, the one or more early measurements on the at least one carrier (e.g. see block 302) comprise at least one measurement on at least one high priority carrier (i.e. non-EMR high priority carrier) according to the second periodicity and at least one measurement on at least one different carrier (e.g. at least one EMR carrier) according to the first periodicity.

In an example embodiment, if the UE 100 is configured with at least one high priority carrier (e.g. the at least one carrier comprises at least one high priority carrier), the UE 100 measures the at least one carrier (e.g. each of the at least one carrier) according to a certain specific periodicity. For example, this certain specific periodicity may be the second periodicity. However, in such case the other periodicity may be not necessarily be used at all (e.g. the first periodicity in this example). In another example, the certain specific periodicity is the first periodicity.

Figure 7:
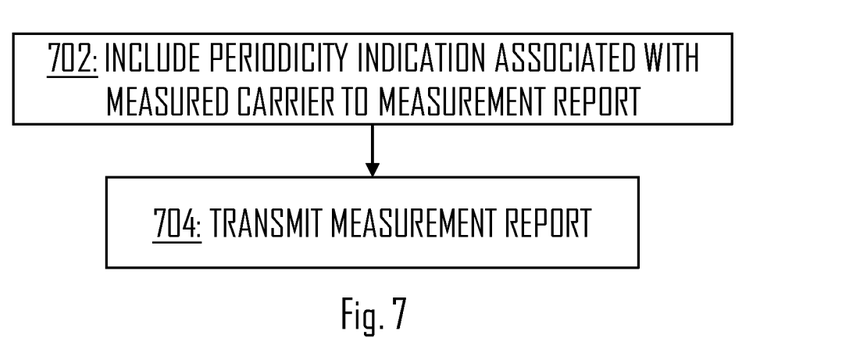

FIG. 7 illustrates an embodiment related to the UE 100 indicating the at least one determined measurement periodicity to the network element 210. So, for example, the early measurement report may comprise an indication about used measurement periodicity for at least one configured carrier. That is, in general, the UE 100 may indicated used measurement periodicity to the network element 210.

Referring to FIG. 7, in block 702, the UE 100 may perform the indication by including an indication about used periodicity associated with an indication about measured carrier into the early measurement report.

In block 704, the early measurement report may be transmitted to the network element 210. This may be similar as transmitting in block 304, for example.

So, for example, if UE measures two carriers (e.g. two inter-frequency carriers), the UE may determine measuring periodicity per carrier. Thus, the determined measuring periodicity may be carrier specific meaning that for a first carrier, the determined measuring periodicity may be different compared with a determined measuring periodicity of a second carrier. The early measurement report may comprise results of said measurements, and further the UE may include indication about the determined measuring periodicity into the early measurement report. So, for example, early measurement report may comprise an information element indicating that for measuring the first carrier a certain measurement periodicity was used (e.g. first or second periodicity) and an information element indicating that for measuring the second carrier a certain measurement periodicity was used (e.g. first or second periodicity, may be different than the periodicity used for measuring the first carrier).

In one example embodiment, the UE indicates the at least one determined measurement periodicity to the network element 210 such that one indication indicates determined measurement periodicity for a plurality of configured carriers. So, for example, if same periodicity is used to measure more than carrier, the indication may cover all said measured carriers.

For example. the indication about the used periodicity may indicate whether a first periodicity or second periodicity was used. Such may be achieved using one-bit indicator, for example (i.e. 0 indicates one and 1 another of the two periodicities). Potentially, more than two periodicities may be usable and/or selectable. Hence, in such cases, the indication may be configured such that it may be used to indicate each of the more than two periodicities. Similar indication may be used by the network element 210 if it configures the UE 100 to use certain periodicity for measuring one or more carriers. As described, the indication may sometimes be comprised in the early measurement report, for example.

Figure 8:
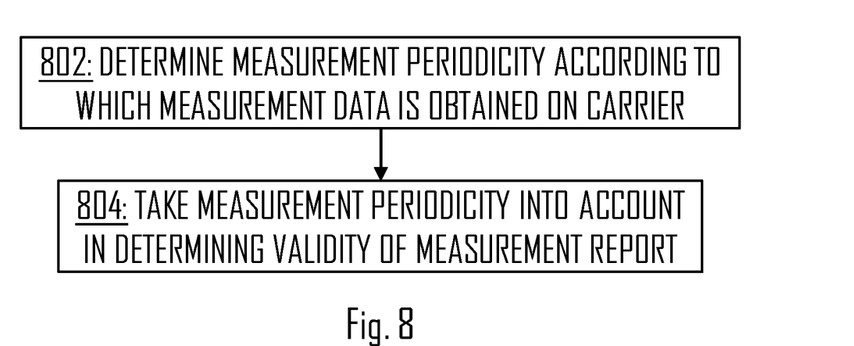

FIG. 8 illustrates an embodiment. Referring to FIG. 8, in block 802, the network element 210 may determine the at least measurement periodicity. For example, the determining may be based on the early measurement report. For example, the determination may be based on an indication from the UE and/or a type of the at least one carrier. As described, the UE may in some cases indicate the used measurement periodicity (e.g. per measured carrier). Such indication may be comprised in the early measurement report, for example. In another example, the network element 210 may determine the at least one measurement periodicity (i.e. the at least one measurement periodicity used by the UE 100 in obtaining the measurement result(s) on the carrier(s)) based on the type of the measured carrier. That is, the network element 210 may, based on the type of the carrier, first condition and second condition, determine what or which periodicity was used by the UE 100. Hence, for example, if carrier is EMR carrier or high priority carrier, the network element 210 may determine that a certain periodicity was used. For example, for high priority non-EMR carrier the second periodicity may be used at least in some example embodiments. That is, the network element 210 may in some examples determine whether first periodicity or second periodicity was used based on the first and second conditions and type of the measured at least one carrier.

The indication about the used measuring periodicity may be applicable in various different scenarios. For example, if the UE 100 may select which or what measurement periodicity it applies, the indication may be beneficial so that the network element 210 may know for certain what measurement periodicity was used. Thus, the network element 210 may evaluate whether the reported result(s) are useful or not. If deemed useful, they may be taken into account in configuring radio resources for the UE (e.g. CA and/or DC configuration), for example. However, if the result(s) are deemed not useful, they may be discarded, for example. If such indication is not used, and the network element 210 may not determine the used periodicity in some other way (e.g. based on type of carrier), the network element 210 may assume that the measurement result(s) are obtained according to worst case scenario. This may mean that the network element 210 assumes that the result(s) are obtained using the longer periodicity (e.g. second periodicity). However, such solution may also be applicable as result(s) obtained using the longer periodicity may be valid even if they would be less valid than result(s) obtained using shorter measurement periodicity.

Let us consider an example in which the UE 100 is moving. For a moving UE, the measurement result accuracy and/or validity may differ depending on whether the first periodicity or the second periodicity is used for obtaining measurement results on carrier(s). Thus, for UE(s) that apply second periodicity, the reported result(s) for early measurements may be older than for UE(s) that apply first periodicity.

Figure 6:
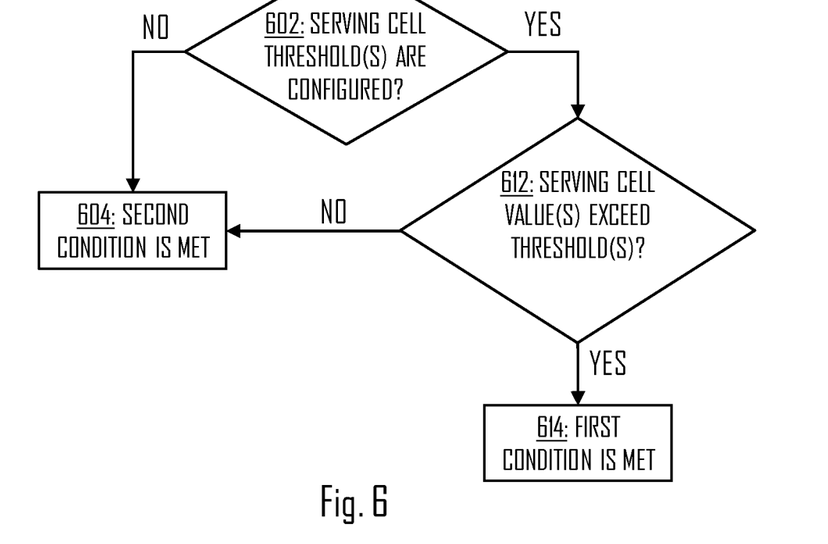

Let us now look at FIG. 6 illustrating an embodiment related to the first condition and second condition determination. Referring to FIG. 6, in block 602, the UE 100 may determine whether or not one or more serving cell thresholds are configured for the UE. If yes, process may continue to block 612. If no, the UE 100 may determine that the second condition is met (block 604).

In block 612, the UE 100 may further determine whether or not one or more serving cell values exceed the one or more serving cell thresholds. If yes, the first condition may be met (block 614). If no, the second condition may be met (block 604). For example, if more than one serving cell threshold is used, all used serving cell thresholds may need to be exceeded by their corresponding values in order to meet the first condition. For example, if at least one of the serving cell thresholds is not exceeded, the second condition may be met.

So, the UE 100 may determine that the first condition is met if one or more serving cell thresholds are configured and corresponding one or more serving cell values exceed said one or more serving cell thresholds. On the other hand, the UE 100 may determine that the second condition is met if one or more serving cell thresholds are not configured or at least one of the one or more serving cell values does not exceed corresponding one or more serving cell threshold. Thus, if more than one cell serving cell value is configured, the second condition is met (i.e. first condition is not met) if at least one of the serving cell values does not exceed corresponding threshold.

Serving cell threshold may refer to s-NonIntraSearch. Thus, the one or more serving cell thresholds may comprise SnonIntraSearchP and/or SnonIntraSearchQ. SnonIntraSearchP may be applicable threshold for Srxlev and SnonIntraSearchQ may be applicable threshold for Srqual. Srxlev and Srqual may be measured in decibels (dB), and thus the corresponding threshold may be set in dB. Srxlev may be a Rx level value and Squal quality value. Srxlev and Srqual may be understood as examples of serving cell values. Sometimes Srxlev and Srqual may be referred to as serving cell quantity values. Srxlev and Srqual may be measured on serving cell of the UE (e.g. UE 100).

Thus, for example, the first condition may be met if s-NonIntraSearch thresholds are configured for the UE, and Srxlev exceeds SnonIntraSearchP and Squal exceeds SnonIntraSearchQ (e.g. Srxlev>SnonIntraSearchP and Squal>SnonIntraSearchQ).

Thus, for example, the second condition may be met if s-NonIntraSearch thresholds are not configured for the UE at all, or Srxlev does not exceed SnonIntraSearchP or Squal does not exceed SnonIntraSearchQ (e.g. Srxlev≤SnonIntraSearchP or Squal≤SnonIntraSearchQ).

Figure 9:
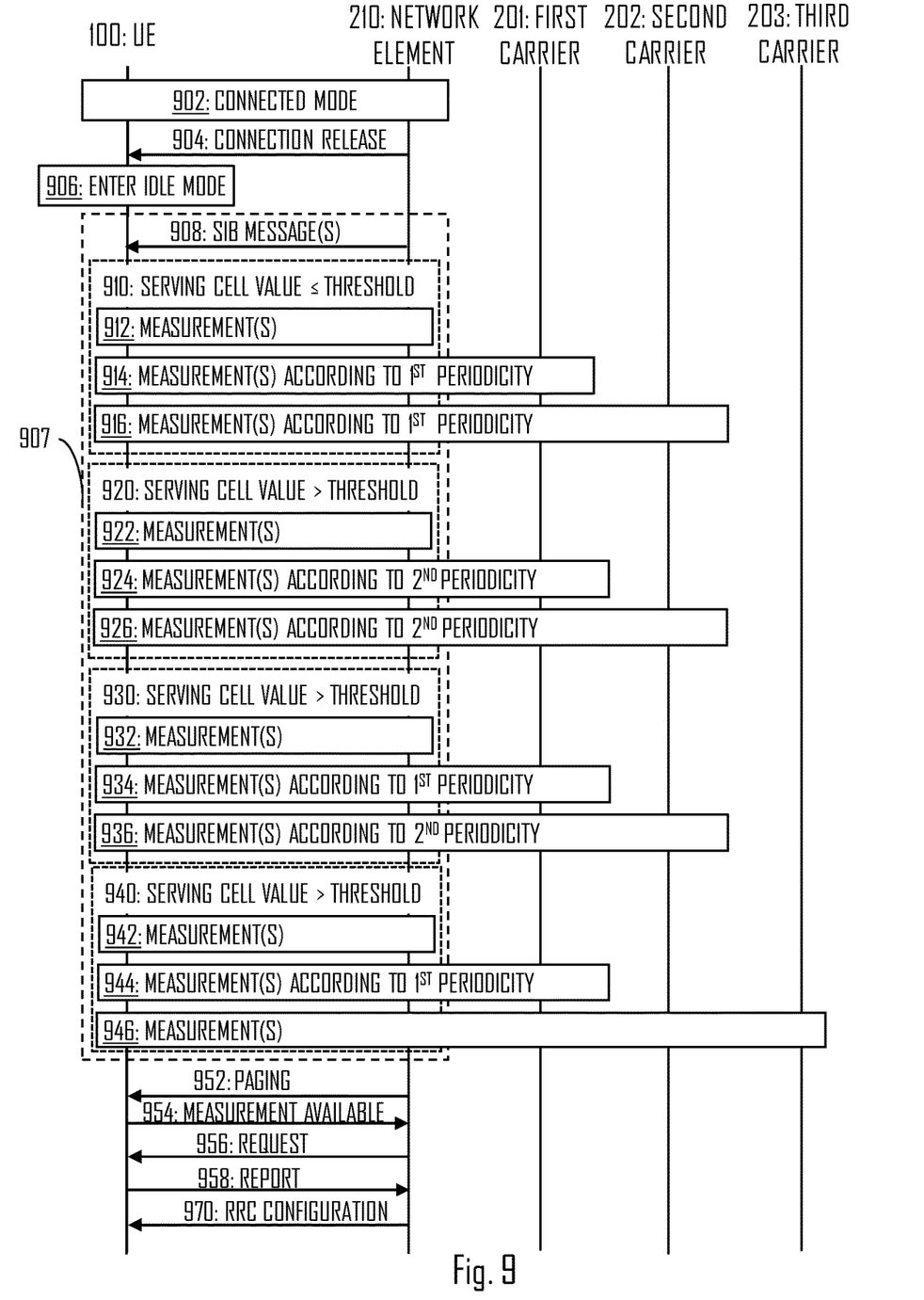
FIG. 9 illustrates measurement modes according to some embodiments.

Let us then draw our attention to FIG. 9 illustrating an example embodiment showing implementation of the solution into the example described with reference to FIG. 2. Referring to FIG. 9, in block 902, the UE 100 may be in connected mode, and the connection mode may be exited upon receiving a connection release 904 from the network element 210. Thus, the UE 100 may enter (block 906) idle mode 907.

As shown with arrow 908, the network element 210 may transmit one or more System Information Block (SIB) message(s) (or similar message(s)) to the UE 100, wherein said messages configure the serving cell threshold(s) for the UE 100. Thus, for example, SnonIntraSearchQ and SnonIntraSearchP may be indicated and configured for the UE 100. Said message(s) may be transmitted when the UE 100 is in the idle mode 907.

FIG. 9 illustrates four different example measurement modes 910, 920, 930, and 940 of the UE 100. Said modes may be, for example, alternatives to each other in certain measurement scenario or embodiment, and the used mode may depend on the first and second conditions. Let us now discuss some examples with the help of the four example measurement modes 910, 920, 930, and 940. In these examples, first carrier 201 may be an EMR carrier (e.g. overlapping EMR carrier), second carrier 202 may be a non-EMR high priority carrier, and third carrier 203 may be a non-EMR low or normal priority carrier. Carriers 201, 202, and 203 may be, for example, inter-frequency carriers. In these measurement mode examples, s-NonIntraSearch threshold(s) may be configured (hence, s-NonIntraSearch is not infinite), and thus Srxlev>SnonIntraSearchP and/or Squal>SnonIntraSearchQ conditions may be fulfilled or not.

In measurement mode 910, UE 100 may apply serving cell threshold(s) (i.e. may apply s-NonIntraSearch) configured by message(s) 908. Further, serving cell threshold(s) may not be exceeded by corresponding serving cell value(s). For example, this may mean that Srxlev≤SnonIntraSearchP or Squal≤SnonIntraSearchQ. In other words, the second condition may be met, and thus the UE 100 may measure carriers 201 and 202 according to the first periodicity (blocks 914, 916). Similar measurements (i.e. with first periodicity) may be performed if serving cell threshold(s) are not configured at all for the UE 100 (e.g. serving cell threshold(s) is set to infinite). Serving carrier(s) (e.g. provided by network element 210) may be measured according to the current serving cell measurement requirements (block 912). Although not shown in FIG. 9, in mode 910, the third carrier, if configured, may be measured similarly as carriers 201, 202 according to the first periodicity.

In measurement mode 920, the UE 100 may apply serving cell threshold(s) for all configured carriers. So, as the serving cell value(s) exceed the corresponding serving cell threshold(s) (e.g. Srxlev>SnonIntraSearchP and Squal>SnonIntraSearchQ), the UE 100 may measure the first and second carriers 201, 202 according to the second periodicity (blocks 924, 926). Serving carrier(s) (e.g. provided by network element 210) may be measured according to the current serving cell measurement requirements (block 922). Although not shown in FIG. 9, in mode 920, the third carrier, if configured, may be measured similarly as carriers 201, 202 according to the second periodicity. In this measurement mode, power may be saved as the measurement periodicity (e.g. for carriers 201 and 202) may be longer than e.g. in measurement mode 910.

In measurement mode 930, the UE 100 may apply serving cell threshold(s) for non-EMR carriers. This may mean that the UE 100 has selected and/or configured to measure the EMR carrier(s) according to the first periodicity. So, as the serving cell values(s) exceed the corresponding serving cell threshold(s) (e.g. Srxlev>SnonIntraSearchP and Squal>SnonIntraSearchQ), the UE 100 may measure the second carrier 202 (i.e. non-EMR carrier) according to the second periodicity (block 936). Serving carrier(s) (e.g. provided by network element 210) may be measured according to the current serving cell measurement requirements or measurement period (block 932). Although not shown in FIG. 9, in mode 930, the third carrier, if configured, may be measured similarly as the second carrier 202 applying the second periodicity. Now, as first carrier 201 may be an EMR carrier, the UE 100 may or may not apply the serving cell threshold(s) for the first carrier, and thus may measure the first carrier according to the first periodicity (block 934) in this example embodiment (in the example shown in FIG. 9, in measurement mode 930, the UE does not apply the serving cell threshold(s) for the first carrier).

It is also possible that the serving cell threshold(s), e.g. in mode 930, are applied for high priority carriers, such as the second carrier 202, and not to other carriers (e.g. EMR carriers and/or non-EMR non-high priority carriers). This may mean that the UE 100 may measure other carriers according to the first periodicity and the non-EMR high priority carriers according to the second periodicity if the first condition is met.

In measurement mode 940, the UE 100 may not be configured with any high priority carriers. So, even if the serving cell value(s) exceed the corresponding serving cell threshold(s) (e.g. Srxlev>SnonIntraSearchP and Squal>SnonIntraSearchQ), the UE 100 may measure the first carrier 201 according to the first periodicity (block 944). Serving carrier(s) (e.g. provided by network element 210) may be measured according to the current serving cell requirements (block 942). The third carrier 203 may be measured according to applying the serving cell thresholds or not and hence according to either first or second periodicity. In an embodiment, the UE shall apply first periodicity.

One further alternative measurement mode would be that if the serving cell values(s) exceed corresponding serving cell threshold(s), the UE 100 is given the right to select whether to apply first or second periodicity for all configured carriers. In one alternative this UE selection is allowed when the UE is configured with one or more higher priority carrier(s). In such case, for example, the indication about selected periodicity per carrier may be beneficial as UE may select the used periodicity per carrier. An indication about the selected periodicity may also be beneficial if the UE selects the same periodicity for all carriers. Such solution may be beneficial in some cases as the UE may be aware of its mobility better than the network element 210, for example.

So, to generalize, the UE 100 may be configured to apply the s-NonIntraSearch for one or more or all configured carriers (e.g. for one or more configured inter-frequency carriers). In some examples, the one or more carriers comprise all inter-frequency carriers configured for the UE 100. In one example, the UE may select to apply the S-NonIntraSearch for one or more configured carriers. An alternative may be that the network (e.g. network element 210) configures the UE to apply s-NonIntraSearch for one or more or all configured carriers. Thus, the UE 100 may not necessarily have the right to select whether to apply the s-NonIntraSearch. What this may mean is that the network may effectively select whether the UE 100 uses first periodicity or second periodicity in measuring one or more carriers. In some examples, as discussed above, the selection may be carrier specific, carrier type specific, carrier group specific (i.e. one or more carriers), or common for all configured carriers.

This flexibility may enable the UE to save power (i.e. second periodicity used for measuring one or more carriers), but still get relevant and accurate measurement results from the UE (e.g. using first periodicity and/or second periodicity). For example, EMR carrier(s) may be measured according to the first periodicity, and non-EMR carriers may be measured according to the second periodicity if the serving cell threshold(s) are exceeded.

Similarly, as in FIG. 2, the idle mode 907 may be exited and connection establishment procedure entered. Connection establishment may comprise paging 952, indication 954 that the early measurement result(s) are available, early measurement report request 956, early measurement report 958, and configuration of radio resources based on the early measurement report (970). These are discussed above (e.g. see FIG. 2) in more detail. The early measurement report 958 may comprise the indication about the used periodicity per carrier, for example.

The proposed solution may allow the network to configure UEs to perform measurements for early measurement reporting and have serving cell thresholds (e.g. cell search thresholds) in use in the cell (e.g. s-NonIntraSearch). In some examples, the solution may allow UE implementation freedom related to whether it is mandated to support inter-frequency/RAT measurements with different periodicities for different carrier types (e.g. EMR carriers, high priority carriers, low/normal priority carriers). In some examples, the solution enables the network to determine the periodicity used by the UE even if the UE would be allowed to select the used periodicity independently.

Figure 10:
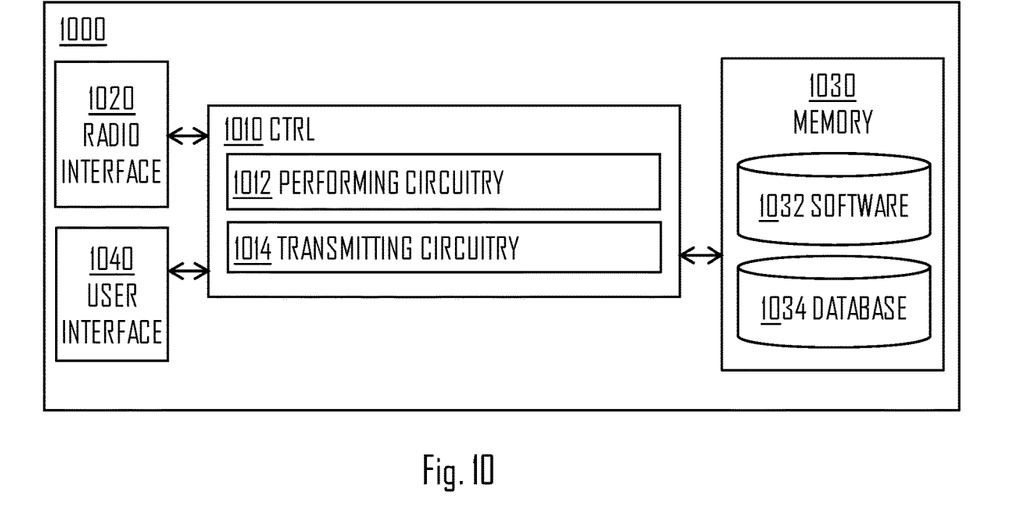
FIGS. 10 and 11 illustrate block diagrams of apparatuses according to some embodiments.
Figure 11:
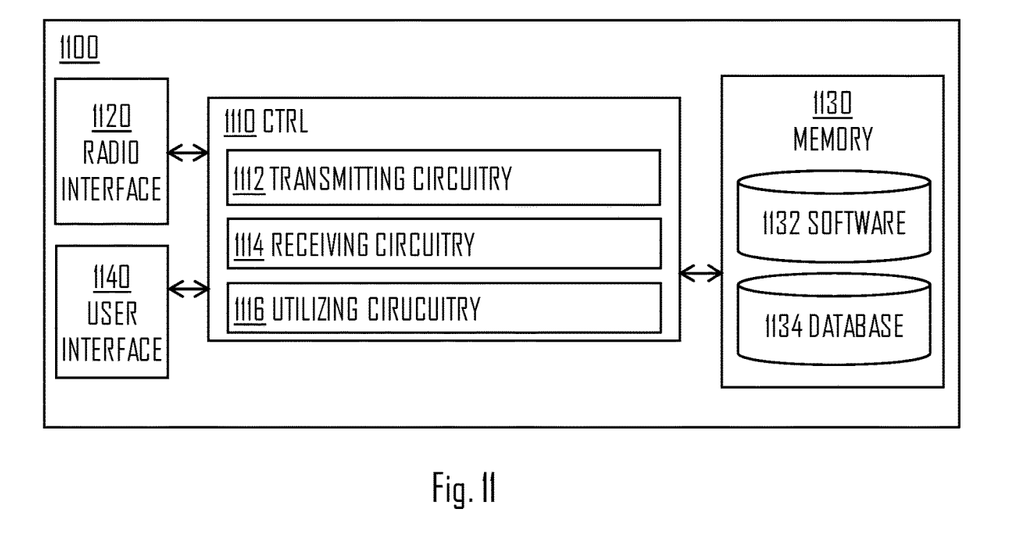

FIGS. 10 and 11 provide apparatuses 1000, 1100 comprising a control circuitry (CTRL) 1010, 1110, such as at least one processor, and at least one memory 1030, 1130 including a computer program code (software) 1032, 1132, wherein the at least one memory and the computer program code (software) 1032, 1132, are configured, with the at least one processor, to cause the respective apparatus 1000, 1100 to carry out any one of the embodiments of FIGS. 1 to 9, or operations thereof.

Referring to FIGS. 10 and 11, the memory 1030, 1130, may be implemented using any suitable data storage technology, such as semiconductor based memory devices, flash memory, magnetic memory devices and systems, optical memory devices and systems, fixed memory and removable memory. The memory 1030, 1130 may comprise a database 1034, 1134 for storing data.

The apparatus 1000, 1100 may further comprise radio interface (TRX) 1020, 1120 comprising hardware and/or software for realizing communication connectivity according to one or more communication protocols. The TRX may provide the apparatus with communication capabilities to access the radio access network, for example. The TRX may comprise standard well-known components such as an amplifier, filter, frequency-converter, (de)modulator, and encoder/decoder circuitries and one or more antennas.

The apparatus 1000, 1100 may comprise user interface 1040, 1140 comprising, for example, at least one keypad, a microphone, a touch display, a display, a speaker, etc. The user interface 1040, 1140 may be used to control the respective apparatus by a user of the apparatus 1000, 1100.

In an embodiment, the apparatus 1000 may be or be comprised in the UE performing the method described above e.g. with respect to FIG. 3. For example, the apparatus 1000 may be or be comprised in the UE 100 or UE 102.

In an embodiment, the apparatus 1100 may be or be comprised in the network element performing the method described above e.g. with respect to FIG. 4. For example, the apparatus 1100 may be or be comprised in the network element 210. For example, the apparatus 1100 may be or be comprised in the network node 104.

According to an embodiment, with reference to FIG. 10, the control circuitry 1010 comprises a performing circuitry 1012 configured at least to perform operations described with respect to block 302 of FIG. 3; and a transmitting circuitry 1014 configured at least to perform operations described with respect to block 303 of FIG. 3.

According to an embodiment, with reference to FIG. 11, the control circuitry 1110 comprises a transmitting circuitry 1112 configured at least to perform operations described with respect to block 402 of FIG. 4; a receiving circuitry 1114 configured at least to perform operations described with respect to block 404 of FIG. 4; and a utilizing circuitry 1116 configured at least to perform operations described with respect to block 406 of FIG. 4.

In an embodiment, at least some of the functionalities of the apparatus 1100 may be shared between two physically separate devices, forming one operational entity. Therefore, the apparatus 1100 may be seen to depict the operational entity comprising one or more physically separate devices for executing at least some of the described processes. Thus, the apparatus 1100 utilizing such shared architecture, may comprise a remote control unit (RCU), such as a host computer or a server computer, operatively coupled (e.g. via a wireless or wired network) to a remote radio head(s) (RRH) located in a base station or network node 104, for example. In an embodiment, at least some of the described processes may be performed by the RCU. In an embodiment, the execution of at least some of the described processes may be shared among the RRH and the RCU. For example, CU/DU split may utilize such shared architecture.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

According to an aspect there is provided a system comprising a plurality of apparatuses 1000 and one or more apparatuses 1100.

As used in this application, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that utilize software or firmware for operation, even if the software or firmware is not physically present. This definition of 'circuitry' applies to uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1 to 9 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 9 or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIG. 1 to 9, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1 to 9 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the disclosure has been described above with reference to an example according to the accompanying drawings, it is clear that the disclosure is not restricted thereto but can be modified in several ways within the scope of the appended claims. Therefore, words and expressions herein should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising at least one processor, and at least one memory including program code, wherein the at least one memory and the computer program code are configured, with the at least one processor, to cause the apparatus to perform operations comprising:
   performing, by a user equipment, UE, of a wireless communication network, one or more early measurements on at least one carrier according to at least one determined measurement periodicity, wherein a measurement periodicity for a carrier of the at least one carrier is:
   a first periodicity if a second condition regarding one or more serving cell thresholds is met, or
   a second different periodicity if a first condition regarding the one or more serving cell thresholds is met and if the UE is configured with a high priority carrier; and
   in response to a request from a network element of the wireless communication network, transmitting an early measurement report comprising one or more measurement results obtained by performing the one or more early measurements.

2. The apparatus of claim 1, wherein the at least one memory and the computer program code are configured, with the at least one processor, to cause the apparatus further to perform operations comprising:
   if the first condition is met and the UE is not configured with one or more high priority carriers, performing the one or more early measurements according to the first periodicity.

3. The apparatus of claim 1, wherein the at least one memory and the computer program code are configured, with the at least one processor, to cause the apparatus further to perform operations comprising:
   if the first condition is met and the UE is configured with the high priority carrier and at least one different carrier, performing one or more early measurements on the at least one different carrier according to the first periodicity or the second periodicity.

4. The apparatus of claim 3, wherein the at least one different carrier is measured according to the second periodicity.

5. The apparatus of claim 3, wherein the at least one different carrier is measured according to the first periodicity.

6. The apparatus of claim 1, wherein the at least one memory and the computer program code are configured, with the at least one processor, to cause the apparatus further to perform operations comprising:
   determining that the first condition is met if one or more serving cell thresholds are configured for the UE and corresponding one or more serving cell values exceed said one or more serving cell thresholds.

7. The apparatus of claim 1, wherein the at least one memory and the computer program code are configured, with the at least one processor, to cause the apparatus further to perform operations comprising:
   determining that the second condition is met if one or more serving cell thresholds are not configured for the UE or at least one of one or more serving cell values does not exceed corresponding one or more serving cell thresholds.

8. The apparatus of claim 1, wherein the at least one memory and the computer program code are configured, with the at least one processor, to cause the apparatus further to perform operations comprising:
   indicating the at least one determined measurement periodicity to the network element.

9. The apparatus of claim 8, wherein the indicating of the at least one determined measurement periodicity is performed by including an indication about used measurement periodicity associated with an indication about the measured carrier into the early measurement report.

10. An apparatus comprising at least one processor, and at least one memory including program code, wherein the at least one memory and the computer program code are configured, with the at least one processor, to cause the apparatus to perform operations comprising:
    transmitting, by a network element of a wireless communication network, an early measurement report request to a user equipment, UE, of the wireless communication network;
    in response to the request, receiving the early measurement report comprising one or more measurement results obtained by performing one or more early measurements on at least one carrier according to at least one measurement periodicity, wherein a measurement periodicity for a carrier of the at least one carrier is:
    a first periodicity if a second condition regarding one or more serving cell thresholds is met, or
    a different second periodicity if a first condition regarding the one or more serving cell thresholds is met and if the UE is configured with a high priority carrier; and
    utilizing the early measurement report in configuring the UE for data transfer.

11. The apparatus of claim 10, wherein the at least one memory and the computer program code are configured, with the at least one processor, to cause the apparatus further to perform operations comprising:
    determining, based on an indication from the UE and/or a type of the at least one carrier, the at least one measurement periodicity; and
    taking into account the at least one measurement periodicity in determining validity of the early measurement report.

12. A method for a user equipment, UE, of a wireless communication network, the method comprising:

performing one or more early measurements on at least one carrier according to at least one determined measurement periodicity, wherein a measurement periodicity for a carrier of the at least one carrier is:
a first periodicity if a second condition regarding one or more serving cell thresholds is met, or
a second different periodicity if a first condition regarding the one or more serving cell thresholds is met and if the UE is configured with a high priority carrier; and
in response to a request from a network element of the wireless communication network, transmitting an early measurement report comprising one or more measurement results obtained by performing the one or more early measurements.

13. The method of claim 12, further comprising:
if the first condition is met and the UE is not configured with one or more high priority carriers, performing the one or more early measurements according to the first periodicity.

14. The method of claim 12, further comprising:
if the first condition is met and the UE is configured with the high priority carrier and at least one different carrier, performing one or more early measurements on the at least one different carrier according to the first periodicity or the second periodicity.

15. The method of claim 14, wherein the at least one different carrier is measured according to the second periodicity.

16. The apparatus of claim 14, wherein the at least one different carrier is measured according to the first periodicity.

* * * * *